United States Patent [19]
Bos et al.

[11] Patent Number: 5,387,920
[45] Date of Patent: Feb. 7, 1995

[54] SWITCHABLE COLOR FILTER AND FIELD SEQUENTIAL FULL COLOR DISPLAY SYSTEM INCORPORATING SAME

[75] Inventors: Philip J. Bos, Portland; Philip A. Johnson, Jr., Beaverton, both of Oreg.

[73] Assignee: Tektronix Inc., Wilsonville, Oreg.

[21] Appl. No.: 412,021

[22] Filed: Aug. 18, 1989

Related U.S. Application Data

[63] Continuation of Ser. No. 535,523, Sep. 26, 1983, abandoned.

[51] Int. Cl.$^6$ .............................................. G09G 3/36
[52] U.S. Cl. ..................................... 345/88; 348/758; 359/62
[58] Field of Search ............... 340/703, 716, 757, 784, 340/795; 350/337, 335, 347 E, 352, 377, 382, 403, 407, 408, 347 R; 358/61; 345/88; 348/758; 359/62

[56] References Cited

U.S. PATENT DOCUMENTS

| | | |
|---|---|---|
| 2,493,200 | 1/1950 | Land . |
| 2,586,635 | 2/1952 | Fernsler ........................ 350/408 X |
| 2,638,816 | 5/1953 | Stolzer . |
| 2,715,153 | 8/1955 | Sziklai ......................... 350/408 X |
| 2,753,763 | 7/1956 | Haines ......................... 350/408 |
| 2,834,254 | 5/1958 | Sage . |
| 3,131,253 | 4/1964 | Zandman et al. . |
| 3,482,182 | 12/1969 | Kosanke et al. ............. 350/403 X |
| 3,536,921 | 10/1970 | Caulfield ..................... 350/403 X |
| 3,806,227 | 4/1974 | Greubel et al. .............. 350/337 |
| 4,017,156 | 4/1977 | Moriyama et al. ........... 350/403 X |
| 4,019,808 | 4/1977 | Scheffer . |
| 4,025,164 | 5/1977 | Doriguzzi et al. ........... 350/408 X |
| 4,061,417 | 12/1977 | Katagiri ........................ 350/352 |
| 4,097,128 | 6/1978 | Matsumoto et al. ........ 350/347 E X |
| 4,103,260 | 7/1978 | Buchman ...................... 350/403 X |
| 4,232,948 | 11/1980 | Shanks . |
| 4,239,349 | 12/1980 | Scheffer ....................... 350/337 X |
| 4,241,339 | 12/1980 | Ushiyama .................... 340/784 X |
| 4,295,093 | 10/1981 | Middleton . |
| 4,328,493 | 5/1982 | Shanks et al. ............... 340/784 |
| 4,403,832 | 9/1983 | Tanaka et al. ............... 350/337 X |
| 4,436,376 | 3/1984 | Fergason . |
| 4,461,543 | 7/1984 | McMahon ..................... 350/403 X |
| 4,471,351 | 9/1984 | Anderson ..................... 340/795 X |
| 4,497,543 | 2/1985 | Aoki et al. ................... 350/337 |
| 4,566,758 | 1/1986 | Bos .............................. 350/347 E |

FOREIGN PATENT DOCUMENTS

| | | |
|---|---|---|
| 0052000 | 5/1982 | European Pat. Off. . |
| 2260155 | 8/1975 | France . |
| 55-142316 | 11/1980 | Japan . |

OTHER PUBLICATIONS

Smith, Kevin: "Liquid Crystal Shutter Changes Monochrome TV Images into Color," *Electronics*, vol. 54, No. 6 (Mar. 1981) pp. 81–82.

A. N. Brinson and A. D. Edgar, "Liquid Crystal Apparatus for Converting Black and White CRT Display into Colored Display," IBM Technical Disclosure Bulletin, vol. 22, No. 5, Oct. 1979, pp. 3–4.

C. F. Van Doorn, "Transient Behavior of Twisted Nematic Liquid-Crystal Layer in an Electric Field," *Journal De Physique*, vol. 36, pp. C1-261–C1-263.

*Primary Examiner*—Richard Hjerpe
*Attorney, Agent, or Firm*—John D. Winkelman; Paul S. Angello

[57] ABSTRACT

A switchable color filter (11) includes three polarizing filters (12, 14, and 16) and two zero to substantially half-wave optical retarders (36 and 38) and is incorporated in a field sequential display system (10) to provide output states of light of three different colors to form an image in full color. Each one of four preferred embodiments (11, 11a, 11b, and 11c) of the switchable color filter provides the output states of three colors. The third and fourth preferred embodiments (11b and 11c) provide a fourth additional output state of, respectively, white light and light of a color which is a combination of two of the other output state colors. The optical retarders comprise nematic liquid crystal cells (100) having fast relaxation times to operate the display system at video rates.

28 Claims, 3 Drawing Sheets

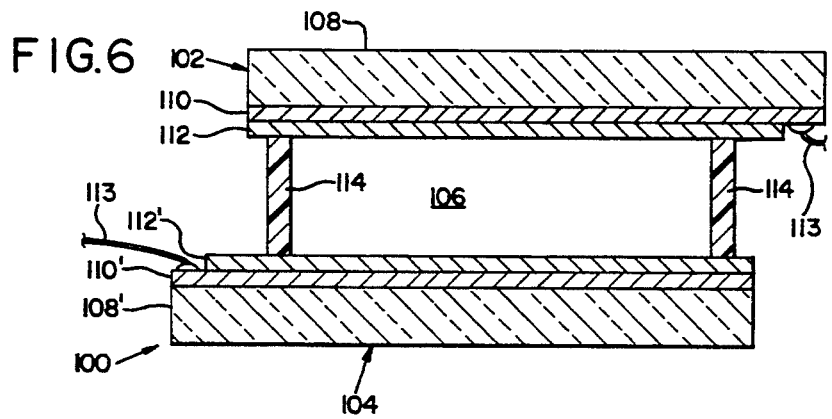
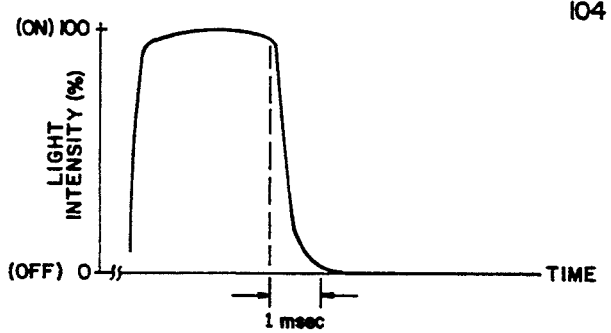
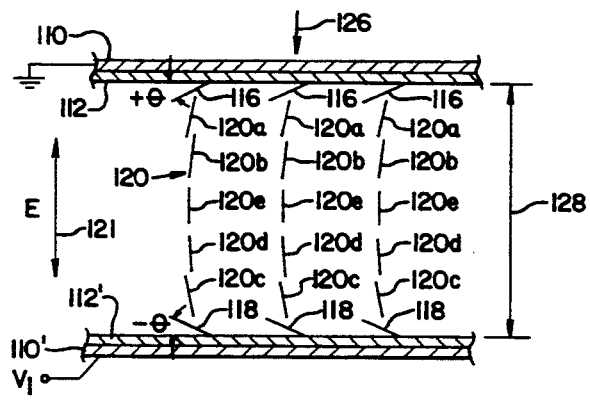
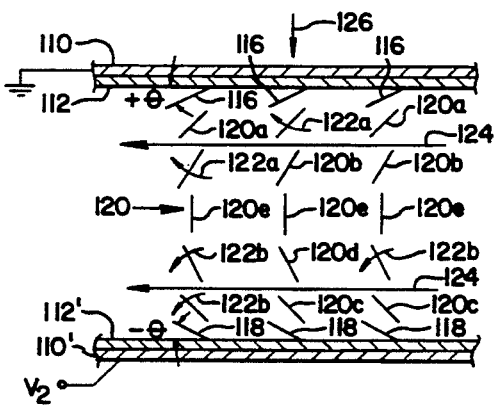
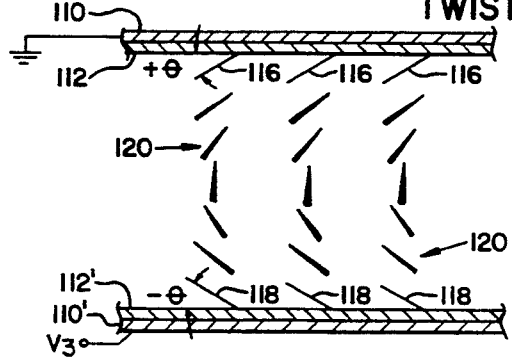
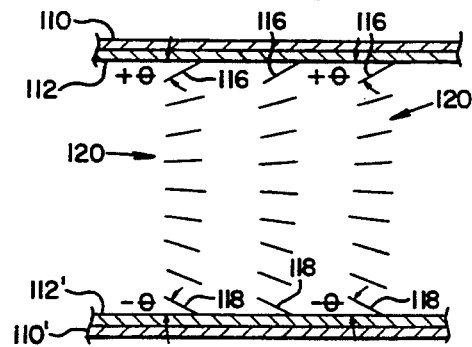

SWITCHABLE COLOR FILTER AND FIELD SEQUENTIAL FULL COLOR DISPLAY SYSTEM INCORPORATING SAME

This is a continuation of application of Ser. No. 535,523 filed Sep. 26, 1983 and now abandoned.

TECHNICAL FIELD

This invention relates to color switches, and in particular, a switchable color filter which includes a light polarizing system and a pair of variable optical retarders and which a preferred utilization thereof is in a field sequential color display system to provide output states of light of three different colors to form an image in full color.

BACKGROUND OF THE INVENTION

Switchable color filters which include birefringent materials have been known heretofore to be positioned in front of black and white cathode ray tubes of field sequential color display systems to produce light images in full color. One such display system is disclosed in U.S. Pat. No. 2,638,816 of Stolzer who describes an adapter which receives light emitted from a black and white television set and produces a light image in different colors. The adapter includes passive birefringent sheets which develop light of different colors. A half-wave optical retardation device operates as a light gate which transmits light of the desired color in the proper sequence in synchronism with the frames of image information appearing on the black and white television screen.

One disadvantage inherent in the device of Stolzer is that the colors developed from the transmission of light through passive birefringent sheets are generally impure and vary in appearance as a function of the viewing angle. The adapter also employs interdigitated electrodes which present a pattern of lines across the display screen. The device of Stolzer, therefore, produces color images which are not acceptable for most image display applications.

U.S. Pat. No. 4,003,081 of Hilsum et al. describes a color display system which incorporates an optically active twisted nematic liquid crystal cell that includes a separate layer of passive birefringent material to produce light of different colors. Light of the desired color is selectively transmitted through a system of neutral polarizers in response to a change in the frequency or intensity of an electric field applied to the liquid crystal cell.

U.S. Pat. No. 4,019,808 of Scheffer describes a color display system which is similar to that of Hilsum et al. Scheffer employs a twisted nematic liquid crystal cell in combination with a passive birefringent optical retardation plate or sheet to produce light of different colors. Both of the display systems described by Hilsum et al. and Scheffer produce light images which exhibit colors of an impure quality that is generally characteristic of the colors developed from passive birefringent materials. The twisted nematic liquid crystal cells are utilized in both systems to rotate the plane of polarization of light passing therethrough.

U.S. Pat. No. 4,097,128 of Matsumoto et al. and U.S. Pat. No. 4,232,948 of Shanks describe color display devices which incorporate a tunable birefringent liquid crystal cell that functions as a variable optical retarder whose birefringence is changed to develop light of various colors. In each device, the liquid crystal cell is included in an assembly of neutral polarizers which transmit light of different colors in response to a change in the birefringence of the liquid crystal cells to provide an image in full color. The change in birefringence is accomplished by varying the magnitude of a voltage which is applied to the cell. As indicated in FIG. 4 of the Matsumoto et al. patent, the maximum transmittance of light of a particular primary color which is developed by changing the birefringence of a liquid crystal cell is not accompanied by a minimum transmittance of light of the remaining primary colors. The Matsumoto et al. and Shanks devices are incapable, therefore, of providing light of pure quality. Moreover, devices using the birefringence properties of a liquid crystal material to produce light of different colors typically exhibit slow switching responses and limited viewing angles.

Switchable color filters which include optically active polarization switching devices in combination with color selective polarizing filters also have been incorporated in field sequential color display systems. An example of such a display system is disclosed in IBM Technical Disclosure Bulletin, Vol. 22, No. 5, Oct. 1979, pp. 1769–1772, "Liquid Crystal Apparatus for Converting Black and White CRT Display into Colored Display" by A. N. Brinson and A. D. Edgar who describe a switchable color filter that incorporates liquid crystal devices for converting a black and white cathode ray tube image into a full color image.

The liquid crystal device rotates by 90° the polarization direction of light rays of all colors passing through the device. The ability to rotate by 90° light rays of all wavelengths simplifies the task of designing a switchable color filter in that no consideration is required as respects the tuning, birefringence properties, and thickness of the liquid crystal device in specifying the orientation of and colors transmitted by the polarization axes of the polarizing filters to provide a light output of the desired color. The use of optically active liquid crystal devices has the disadvantage of requiring the application of two-frequency high voltage drive signals to switch the device at video rates to produce an image in full color.

SUMMARY OF THE INVENTION

One of the objects of this invention is to provide a switchable color filter which is utilized in a field sequential display system to provide a light image in full color with strong color contrast and a high degree of resolution.

Another object of this invention is to provide such a switchable color filter which employs a color selective light polarizing system and a pair of zero to substantially half-wave optical retarders to provide output states of light of three different colors.

A further object of this invention is to provide such a switchable color filter which incorporates variable optical retarders in the form of nematic liquid crystal cells to produce a display image in full color which can be observed within a wide range of viewing angles.

Still another object of this invention is to provide such a switchable color filter which incorporates a pair of liquid crystal variable optical retarders that have short transition times between optical states to facilitate the synthesis of a display image in full color by switching at video rates among output states of light of at least three different colors.

The present invention relates to a switchable color filter which receives light from a light source. The switchable color filter employs three polarizing means which are optically coupled to the light source. At least two of the three polarizing means include color selective polarizing filters. Each one of a pair of variable optical retarding means is disposed between a different pair of the three polarizing means. A control means which is in communication with the pair of variable optical retarding means selectively passes a light output of one of at least three colors.

A particular set of output states that provide light of the desired colors, which may be, for example, the three primary colors or the three primary colors and white light, can be synthesized in numerous ways. This is accomplished through the selection of the transmission spectrum of the color selective polarizers. In each case, the specification of the color of light to which the variable optical retarders are tuned depends on the choice of colors of light rays transmitted by the color selective polarizing filters. The description of the first preferred embodiment presented hereinbelow sets forth the procedure for determining an appropriate set of polarizing filters and for specifying the tuning of the variable optical retarders for the special case when the axes of linear polarizing filters are complementary. It is emphasized that the restriction on the nature of the polarizers is introduced only to present a comprehensive teaching exercise of one preferred embodiment of the invention. The second, third, and fourth preferred embodiments present empirically derived examples of switchable color filters for which the restriction on the complementary nature of the polarizing filters is unnecessary.

In a first preferred embodiment of the switchable color filter, each one of the three polarizing means comprises a linear polarizing filter which has first and second substantially orthogonally related polarization states or axes that transmit and absorb light of the three primary colors red, green, and blue. At least two of the three polarizing filters have color selective polarization axes which transmit light of at least one of the primary colors and absorb light of the other primary color or colors. One of the polarizing filters can comprise a neutral polarizing filter which has a first polarization axis which transmits light of the three primary colors, i.e., white light, and a second polarization axis which absorbs light of the three primary colors. The polarization axes of each of the three polarizing filters are complementary in that neither polarization axis transmits light of a primary color which is transmitted by the other polarization axis.

Each one of the two variable optical retarding means comprises a zero to substantially half-wave optical retarder which has two light communicating surfaces and is capable of producing substantially half-wave retardation of light of one predetermined color. Each variable optical retarder is oriented so that the projection of its optic axis on both of its light communicating surfaces is disposed substantially at 45° angles with respect to the polarization axes of the three polarizing filters.

The transmission of light of one of three different colors is selectively controlled by a control means which applies a different output switching signal to each one of the pair of variable optical retarders. The output signal of the control means commands the variable optical retarder to switch to a first ("ON") state that produces nearly zero optical retardation of light passing therethrough or a second ("OFF") state that produces substantially half-wave retardation for light of a color or wavelength which is governed by the thickness of the device. The four possible combinations of switching states for the pair of variable optical retarders provide the switchable color filter with four possible output states of light. Three of the four possible output states of light are selected to provide at the output of the switchable color filter light of three colors.

In a second preferred embodiment of the switchable color filter, only the linear polarizing filter which is disposed between the pair of variable optical retarders has polarization states or axes which are complementary as defined hereinabove. Each one of the other two polarizing filters transmits light of at least one common color through both of its polarization axes to provide output states of light of three different colors.

In a third preferred embodiment of the switchable color filter, none of the three linear polarizing filters has complementary polarization states or axes and each polarizing filter has one polarization axis which transmits white light. All four of the output states provide a selection of light of three different colors and white light at the output of the switchable color filter.

In a fourth preferred embodiment of the switchable color filter, each one of the three linear polarizing filters has at least one polarization state or axis which transmits light of at least two colors. Each one of the three output states provides light of a different one of the colors transmitted by the polarization axes, and the fourth output state provides light of a color which is a combination of light of two colors transmitted by the polarization axes.

In the preferred embodiments of the switchable color filter of the present invention, each variable optical retarder is comprised of a nematic liquid crystal cell which remains disclination-free and switches in a bounce-free manner as it is switched between the two optical retardation states which alter the orientation of the surface noncontacting directors of the liquid crystal material in the cell. The use of a liquid crystal cell of this construction as a variable optical retardation device produces a single-frequency, high-speed switch which requires low power circuitry to produce a superior image in full color which can De observed within a wide range of viewing angles.

A field sequential color display system incorporating any one of the preferred embodiments of the switchable color filter when synchronized to the frame sequencer provides a flicker-free picture with an image in full color having sharp contrast and great detail.

Additional objects and advantages of the present invention will be apparent from the following detailed descriptions of preferred embodiments thereof which proceed with reference to the accompanying drawings.

BRIEF DESCRIPTION OF THE DRAWINGS

FIG. 6 is a diagrammatic cross-sectional side elevation view of the liquid crystal cell which is used as a zero to substantially half-wave optical retarder in accordance with the present invention.

FIGS. 7A, 7B, 7C, and 7D are schematic diagrams of the director alignment configuration of the liquid crystal cell of the zero to substantially half-wave optical retarder incorporated in the preferred embodiments of the switchable color filter of the present invention in, respectively, the field aligned "ON" state, the partly relaxed "OFF" state, the $\pi$ radian twist state, and the splayed state.

FIG. 8 shows the optical response of a liquid crystal cell of the zero to substantially half-wave optical retarder incorporated in the preferred embodiments of the switchable color filter of the present invention when switched from the "ON" state to the "OFF" state by the removal of a 20 Vrms AC signal pulse.

DETAILED DESCRIPTION OF PREFERRED EMBODIMENTS

General Arrangement and Operation of the Color Display System

Figure 1:
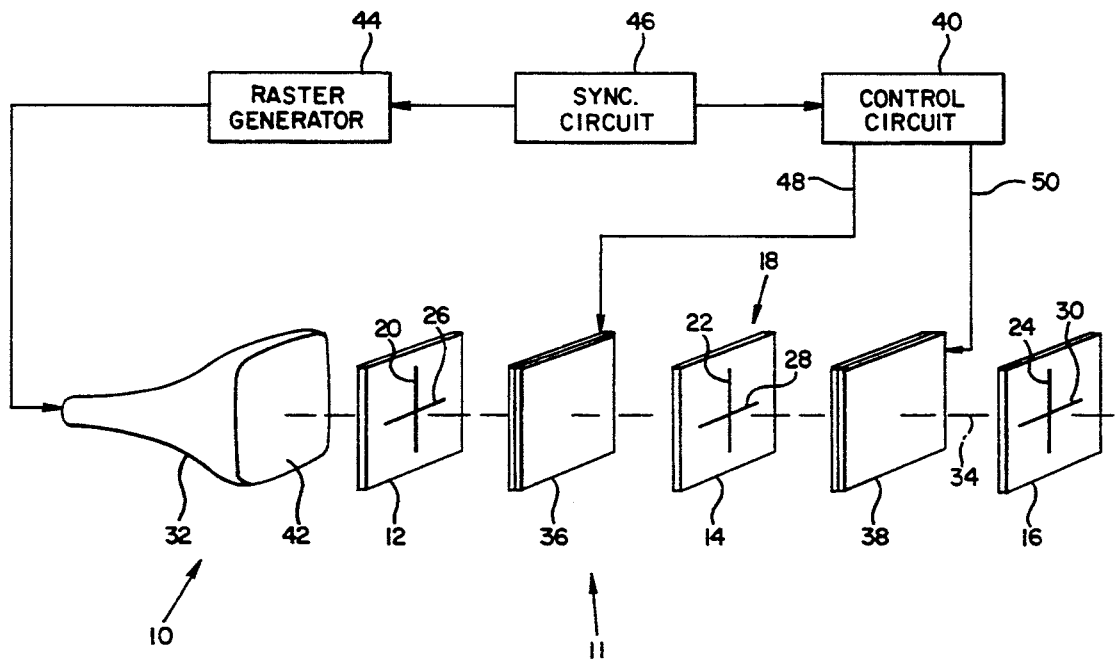
FIG. 1 is a simplified block diagram of a field sequential color display system incorporating a first embodiment of a switchable color filter which includes a light polarizing system and a pair of variable optical retarders to provide an image in full color in accordance with the present invention.

With reference to FIG. 1, a field sequential color display system 10 incorporating a first preferred embodiment of a switchable color filter 11 designed in accordance with the present invention includes three polarizing means or linear polarizing filters 12, 14, and 16 which form a light polarizing system 18. At least two of the three polarizing filters 12, 14, and 16 constitute color selective polarizing filters as will be further hereinafter described.

Each one of polarizing filters 12, 14, and 16 has first and second orthogonally related polarization states or axes. The first polarization axis of each polarizing filter 12, 14, and 16 is a vertical polarization axis 20, 22, and 24, respectively; and the second polarization axis of each polarizing filter 12, 14, and 16 is a horizontal polarization axis 26, 28, and 30, respectively.

The vertical polarization axis and the horizontal polarization axis of each polarizing filter together transmit light of the set of the primary colors red, green, and blue. In the case of a color selective polarizing filter, the color or colors of light transmitted by the vertical polarization axis form a first subset of the set of primary colors and the remaining color or colors of light transmitted by the horizontal polarization axis form a second subset of the set of primary colors. In the case of a neutral polarizing filter, one polarization axis passes light of the entire set of primary colors and the other polarization axis transmits light of none of the colors in the set. In either case of a color selective polarizing filter or a neutral polarizing filter, the axes are complementary as defined hereinabove.

It will be understood by those having ordinary skill in the art that a color selective polarizing filter which transmits colored light through both its vertical and horizontal polarization axes may be formed by combining two polarizing filter elements of which each has a first polarization axis which transmits white light, e.g., light of the primary colors red, green, and blue, and a second polarization axis which transmits light of a preselected color. Arranging the filter elements so that the polarization axes which transmit white light are orthogonally related forms a composite filter that transmits colored light through both axes. References herein to a color selective polarizing filter are not intended to restrict to any particular number the elements which form a filter having the transmission characteristics specified.

The assignment of colors of light transmitted by each of the first and second polarization axes of the three polarizing filters of the first preferred embodiment of the switchable color filter is determined with reference to four Boolean logic expressions which are derived hereinbelow for polarizing filters having complementary vertical and horizontal polarization axes.

Light rays emitted from a light source 32 are received by polarizing filter 12 which serves as an input means of light polarizing system 18. The light rays are optically coupled to each polarizing filter to form optical path 34 through the light polarizing system. Light of one of the three primary colors exits through polarizing filter 16 which serves as an output means of light polarizing system 18.

Each one of a pair of variable optical retarders or retarding means 36 and 38 is disposed between a different pair of adjacent ones of polarizing filters 12, 14, and 16. Variable optical retarders 36 and 38 are disposed respectively between polarizing filters 12 and 14 and polarizing filters 14 and 16. Variable optical retarders 36 and 38 comprise zero to substantially half-wave retarders which selectively provide substantially half-wave retardation of light of a predetermined color in response to the output signals of control circuit or means 40. Each one of variable optical retarders 36 and 38 is a nematic liquid crystal cell that provides nearly zero retardation for light of all colors and substantially half-wave retardation of light of a preselected color in response to a change in magnitude of an AC voltage which is applied to the cell by control circuit 40.

The term optical retardation insofar as it herein relates and is referred to birefringence is defined by way of the following explanation. A light ray incident on a birefringent device is known to be decomposed into two components known as the ordinary and extraordinary light rays. These components of light travel through the birefringent device at different velocities, and when exiting the device, one of the rays is retarded with respect to the other. Retardation results in a relative phase shift between the two exiting rays, which retardation is also related to the wavelength of the exiting ray of light. For example, a device which has an effective birefringence such that $$\frac{\Delta nd}{\lambda} = \frac{1}{2}$$

is referred to as a half-wave retarder, where $\Delta n$ is the effective birefringence, d is the device thickness, and $\lambda$ is the wavelength of the exiting light ray.

The switchable color filter 11 formed by polarizing filters 12, 14, and 16 and variable optical retarders 36 and 38 is positioned in front of light source 32, which emits light of many wavelengths including those of the primary colors from phosphor screen 42, to produce a light image in the red, green, and blue colors. Light source 32 constitutes a cathode ray tube or a projection device which provides a black and white display image. A signal produced by a raster generator 44 in response to one of the outputs of a frame synchronization circuit or means 46 provides a television type raster scan which presents frames of image information in repetitive sequences of three time intervals.

In the first time interval, information relating to both the form of the image which is to appear in a first color, such as red, and the form of the image which is to appear in a color that is the combination of the color red and second and third colors, such as green and blue, respectively, is written on phosphor screen 42. In the second time interval, information relating to both the form of the image which is to appear in the color green and the form of the image which is to appear in a color that is a combination of the colors red, green, and blue is written on phosphor screen 42. In the third time interval, information relating to both the form of the image which is to appear in the color blue and the form of the image which is to appear in a color that is a combination of the colors red, green, and blue is written on phosphor screen 42.

Control circuit 40 receives at its input a signal from an output of frame synchronization circuit 46 and produces two signals at outputs 48 and 50 to drive the respective variable optical retarders 36 and 38 synchronously with the sequential frame rate of image information produced by light source 32.

The sequentially displayed frames of image information provided in the three time intervals are transmitted through polarizing filter 12 and are synchronously transmitted through polarizing filters 14 and 16 and variable optical retarders 36 and 38. This provides in each time interval a light image in the color corresponding to the image information presented to the light source. The retinal persistence of the observer's eyes integrates the information exiting polarizing filter 16 during the three intervals of time corresponding to the three frames of the television raster signal to create the impression of a single display image in full color. Intensity modulation of the light image source produces a color gamut over the full spectral range of visible light.

Optical Component Orientation

Figure 2:
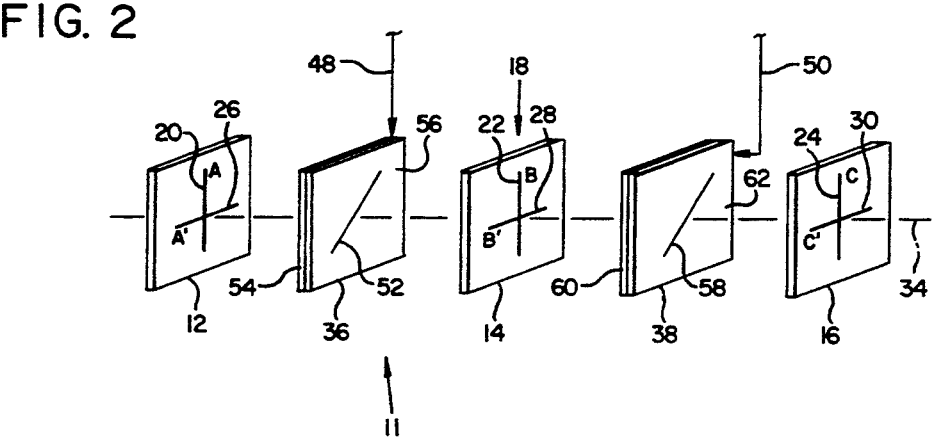
FIG. 2 is a diagram of a first embodiment of the switchable color filter of the present invention in which each polarizing filter has complementary polarization axes.

With reference to FIG. 2, a first preferred embodiment of the switchable color filter of the present invention is shown with each of the three polarizing filters 12, 14, and 16 having orthogonally related polarization axes which are complementary in that neither axis transmits light of a color which is transmitted by the other axis. For the purpose of deriving Boolean logic expressions for the light output transmission functions of the first preferred embodiment of the switchable color filter in each of its four light output states, the vertical polarization axis of each polarizing filter 12, 14, and 16 is denominated A, B, and C, respectively, and the horizontal polarization axis of each polarizing filter 12, 14, and 16 is denominated A', B', and C', respectively.

The projection 52 of the optic axis of variable optical retarder 36 on each of its two light communicating surfaces 54 and 56 and the projection 58 of the optic axis of variable optical retarder 38 on each of its two light communicating surfaces 60 and 62 are disposed substantially at 45° angles with respect to each of the polarization axes of polarizing filters 12, 14, and 16. Each one of variable optical retarders 36 and 38 is switched between two states, the "ON" state which provides nearly zero optical retardation of normally incident light and the "OFF" state which provides substantially half-wave retardation for light of a particular predetermined wavelength. The four possible combinations of switching states for the two variable optical retarders provide the switchable color filter with four output states for transmitting light of different colors.

The light output transmission function for each one of the light output states of the switchable color filter can be represented in terms of Boolean logic expressions. These expressions are set forth in Table I under the column entitled "Light Output Transmission Function" and are derived as explained hereinbelow. For all light output states described herein, it is assumed that the light rays incident on the vertical polarization axis A and horizontal polarization axis A' at the input of polarizing filter 12 include component wavelengths of the primary colors red, green, and blue.

Light output state 1 is defined as the light output transmission function for the switchable color filter when both variable optical retarders 36 and 38 are commanded by control circuit outputs 48 and 50, respectively, to the "ON" states to provide nearly zero retardation of all wavelengths of light passing therethrough. Light rays incident on vertical polarization axis A and horizontal polarization axis A' of polarizing filter 12 become linearly polarized in the vertical and horizontal directions, respectively, and maintain their directions of polarization as they pass through the switchable color filter and exit from polarizing filter 16.

The colors of light which exit from the output of horizontal polarization axis C' of polarizing filter 16 represent the logic intersection of the set of colors of light which can be transmitted through polarization axes A', B', and C'. The colors of light which exit from the output of vertical polarization axis C of polarizing filter 16 represent the logic intersection of the set of colors of light which can be transmitted through polarization axes A, B, and C. Thus, for example, if polarization axes A, B, and C pass light of the colors $C_1$, $C_2$, and $C_3$; $C_1$ and $C_2$; and $C_1$ and $C_3$, respectively, light of only the color $C_1$ is common to all three vertical polarization axes and passes through polarization axis C at the output of polarizing filter 16. The light output transmission function for vertically polarized light is represented in general terms as the logic conjunctive function ABC, which equals $C_1$ for the colors assigned to the vertical polarization axes A, B, and C in this example.

The light output transmission function for horizontally polarized light is expressed in general terms as A'B'C'. The transmission function for light output state 1 is the superposition of the logic expressions for light exiting from horizontal polarization axis C' and vertical polarization axis C of polarizing filter 16 and is expressed as

A'B'C'+ABC.

Light output state 2 is defined as the light output transmission function for the switchable color filter when variable optical retarder 36 is commanded to the "ON" state by control circuit output 48 to provide nearly zero retardation of all wavelengths of light passing therethrough and variable optical retarder 38 is commanded to the "OFF" state by control circuit output 50 to provide substantially half-wave retardation of light of a color which is determined by the thickness of the retarder device.

Light rays incident on vertical polarization axis A and horizontal polarization axis A' of polarizing filter 12 become linearly polarized in the vertical and horizontal directions, respectively, and maintain their directions of polarization as they pass through polarizing filter 14 because variable optical retarder 36 is commanded to the "ON" state. Variable optical retarder 38 is commanded to the "OFF" state which orients the projection 58 of its optic axis on its light communicating surfaces 60 and 62 substantially at 45° angles with respect to both polarization axes C and C' of polarizing filter 16.

Commanding optical retarder 38 to the "OFF" state provides substantially half-wave retardation of light of a predetermined wavelength and separates light rays of all other wavelengths or colors passing therethrough into components which are aligned with the polarization axes of polarizing filter 16. Light rays transmitted through polarization axis B of polarizing filter 14 and variable optical retarder 38, therefore, have components incident on both polarization axis C and polarization axis C' of polarizing filter 16. Similarly, light transmitted through polarization axis B' of polarizing filter 14 and variable optical retarder 38 will have components incident on both polarization axis C and polarization axis C' of polarizing filter 16.

The transmission of light rays which are projected onto and pass through horizontal polarization axis C' of polarizing filter 16 by the function of variable optical retarder 38 in the "OFF" state is expressed as $$A'B'K_2'C' + ABK_2C'$$

where $K_2 = \sin^2 \delta/2$, $K_2' = \cos^2 \delta/2$, and $\delta$ is the optical retardation of variable optical retarder 38 given by
$\delta = 2\pi \Delta \, nd/\lambda$
where
  $\Delta n$ is the effective birefringence;
  d is the thickness of the device; and
  $\lambda$ is the wavelength of the exiting light rays.

The term $A'B'K_2'C'$ represents the light rays of the colors which passed through horizontal polarization axis B' and the term $ABK_2C'$ represents the light rays of the colors which passed through vertical polarization axis B.

The transmission of light rays which are projected onto and pass through the vertical polarization axis C of polarizing filter 16 by the function of variable optical retarder 38 in the "OFF" state is expressed as $$A'B'K_2C + ABK_2'C.$$

The term $A'B'K_2C$ represents the light rays of the colors which passed through horizontal polarization axis B', and the term $ABK_2'C$ represents the light rays of the colors which passed through vertical polarization axis B.

The transmission function for light output state 2 is the superposition of the logic expressions for light exiting from horizontal polarization axis C' and vertical polarization axis C of polarizing filter 16 and is expressed as $$(A'B'K_2'C' + ABK_2C') + (A'B'K_2C + ABK_2'C).$$

Light output state 3 is defined as the light output transmission function of the switchable color filter when variable optical retarder 36 is commanded to the "OFF" state by control circuit output 48 to provide substantially half-wave retardation of light of a color which is determined by the thickness of the retarder device and variable optical retarder 38 is commanded to the "ON" state by control circuit output 50 to provide nearly zero retardation of all wavelengths of light passing therethrough.

Light rays incident on vertical polarization axis A and horizontal polarization axis A' of polarizing filter 12 become linearly polarized in the vertical and horizontal directions, respectively, as they pass through polarizing filter 12. Variable optical retarder 36 is commanded to the "OFF" state which orients the projection 52 of its optic axis on its light communicating surfaces 54 and 56 substantially at 45° with respect to both polarization axes B and B' of polarizing filter 14.

Commanding optical retarder 36 to the "OFF" state provides substantially half-wave retardation of light of a predetermined wavelength and separates light rays of all other wavelengths or colors passing therethrough into components which are aligned with the polarization axes of polarizing filter 14. Light rays transmitted from polarization axis A of polarizing filter 12 through variable optical retarder 36, therefore, will have components incident on both polarization axis B and polarization axis B' of polarizing filter 14. Similarly, light transmitted from polarization axis A' of polarizing filter 12 through variable optical retarder 36 will have components incident on both polarization axis B and polarization axis B' of polarizing filter 14.

The transmission of light rays which are projected onto and pass through horizontal polarization axis B' of polarizing filter 14 by the function of variable optical retarder 36 in the "OFF" state is expressed as $$A'K_1'B' + AK_1B'$$

where $K_1 = \sin^2 \delta/2$, $K_1' = \cos^2 \delta/2$, and $\delta$ is the optical retardation of variable optical retarder 36 given by $\delta$ as defined hereinabove. The term $A'K_1'B'$ represents the light rays of the colors which passed through horizontal polarization axis A', and the term $AK_1B'$ represents the light rays of the colors which passed through vertical polarization axis A.

The transmission of light rays which are projected onto and pass through the vertical polarization axis B of polarizing filter 14 by the function of variable optical retarder 36 in the "OFF" state is expressed as $$A'K_1B + AK_1'B$$

The term $A'K_1B$ represents the light rays of the colors which passed through horizontal polarization axis A', and the term $AK_1'B$ represents the light rays of the colors which passed through vertical polarization axis A.

Light rays transmitted through horizontal polarization axis B' maintain their direction of polarization and pass through horizontal polarization axis C' of polarizing filter 16 because variable optical retarder 38 is commanded to the "ON" state. The transmission function is expressed as $$A'K_1'B'C' + AK_1B'C'.$$

Similarly, light rays transmitted through vertical polarization axis B maintain their direction of polarization and pass through vertical polarization axis C of polarizing filter 16. The transmission function is expressed as $$A'K_1BC + AK_1'BC.$$

The transmission function for light output state 3 is the superposition of the logic expressions for light exiting from horizontal polarization axis C' and vertical polarization axis C of polarizing filter 16 and is expressed as $$(A'K_1'B'C' + AK_1B'C') + (A'K_1BC + AK_1'BC).$$

Light output state 4 is defined as the light output transmission function of the switchable color filter when variable optical retarders 36 and 38 are commanded by control circuit outputs 48 and 50, respectively, to the "OFF" states to provide substantially half-wave retardation of light of a color or colors which are determined by the thicknesses of the retarder devices.

As is the case for light output state 3, light rays transmitted through vertical polarization axis A of polarizing filter 12 and variable optical retarder 36 will have separate components of light rays which are aligned with both polarization axes of polarizing filter 14, and light rays transmitted through horizontal polarization axis A' of polarizing filter 12 and variable optical retarder 36 will have separate components of light rays which are aligned with both polarization axes of polarizing filter 14.

The transmission of light rays which are projected onto and pass through horizontal polarization axis B' of polarizing filter 14 by the function of variable optical retarder 36 in the "OFF" state is expressed as $$A'K_1'B' + AK_{1/B}.$$

The transmission of light rays which are projected onto and pass through vertical polarization axis B of polarizing filter 14 by the function of variable optical retarder 36 in the "OFF" state is expressed as $$AK_1'B + A'K_1B.$$

As is the case of light output state 2, light rays transmitted through vertical polarization axis B of polarizing filter 14 and variable optical retarder 38 will have separate components of light rays which are aligned with both polarization axes of polarizing filter 16, and light rays transmitted through horizontal polarization axis B' of polarizing filter 14 and variable optical retarder 38 will have separate components of light rays which are aligned with both polarization axes of polarizing filter 16.

The transmission of light rays which are projected onto and pass through horizontal polarization axis C' of polarizing filter 16 by the function of variable optical retarder 38 in the "OFF" state is expressed as $$(A'K_1'B'K_2'C' + AK_1B'K_2'C') + (AK_1'BK_2C' + A'K_1BK_2C').$$

The term $(A'K_1'B'K_2'C' + AK_1B'K_2'C')$ represents the light rays of the colors which passed through horizontal polarization axis B' and the term $(AK_1'BK_2C' + A'K_1BK_2C')$ represents the light rays of the colors passed by vertical polarization axis B.

The transmission of light rays which are projected onto and pass through vertical polarization axis C of polarizing filter 16 by the function of variable optical retarder 38 in the "OFF" state is expressed as $$(A'K_1'B'K_2C + AK_1B'K_2C) + (AK_1'BK_2'C + A'K_1BK_2C)$$

The term $(A'K_1'B'K_2C + AK_1B'K_2C)$ represents the light rays of the colors which passed through horizontal polarization axis B', and the term $(AK_1'BK_2'C + A'K_1BK_2'C)$ represents the light rays of the colors which passed through vertical polarization axis B.

The transmission function for light output state 4 is the superposition of the logic expressions for light exiting from horizontal polarization axis C' and vertical polarization axis C of polarizing filter 16 and is expressed as $$[(A'K_1'B'K_2'C' + AK_1B'K_2'C') + (AK_1'BK_2C' + A'K_1BK_2C')] + [(A'K_1'B'K_2C + AK_1B'K_2C) + (AK_1'BK_2'C + A'K_1BK_2'C)].$$

Rearranged and factored versions of the foregoing logic expressions for the light output transmission functions of light output states 1–4 appear in Column 4 of Table I.

TABLE I

| Light Output State | Switching State of Variable Optical Retarder 36 | Switching State of Variable Optical Retarder 38 | Light Output Transmission Function |
|---|---|---|---|
| 1 | ON | ON | $A'B'C' + ABC$ |
| 2 | ON | OFF | $A'B'(K_2C + K_2'C') + AB(K_2C' + K_2'C)$ |
| 3 | OFF | ON | $B'C'(K_1A + K_1'A') + BC(K_1A' + K_1'A)$ |
| 4 | OFF | OFF | $A'[K_1B(K_2C' + K_2'C) + K_1'B'(K_2C + K_2'C')] + A[K_1B'(K_2C + K_2'C') + K_1'B(K_2C' + K_2'C)]$ |

The colors of the light rays for which variable optical retarders 36 and 38 provide substantially half-wave retardation are determined by means of the expressions for the four transmission functions of the light output states which are set forth in Table I. The color display system of the present invention requires the use of only three of the four possible light output states of the switchable color filter to produce the desired light output of three different colors. Control circuit 40 is appropriately designed so that its outputs 48 and 50 do not command the respective variable optical retarders 36 and 38 to the combination of switching states which corresponds to the unused light output state.

As was stated hereinabove, the three light output states provide light outputs of the three primary colors red, blue, and green. Variable optical retarders 36 and 38 of the proper thickness are chosen to produce substantially half-wave retardation for light of the appropriate color as determined in accordance with the procedure set forth hereinbelow.

With reference to Table I, light output states 1, 2, and 4 are selected only by way of example as the ones which produce light outputs of the colors $C_1$, $C_2$, and $C_3$, respectively.

Light output state 1 produces a light output of the color $C_1$ when the term ABC equals $C_1$ and A'B'C' equals zero. As will be the case for the selection of values for other terms in the light output transmission equations, the designations of the color $C_1$ to term ABC and the absence of color to term A'B'C' are made only as a matter of designer's choice.

Light output state 2 produces a light output of the color $C_2$ when the term ABC' equals $C_2$ and A'B'C equals zero. To obtain light of a pure color $C_2$, both terms in the transmission equation relating to $K_2'$ must equal zero. The term A'B'C' was set to zero in the transmission equation for light output state 1; therefore, the term $A'B'K_2'C'$ in the transmission equation for light output state 2 is also zero. The term ABC corresponds to light of the color $C_1$; therefore, variable optical retarder 38, which is commanded to the "OFF" state in light output state 2, must be tuned to provide substantially half-wave retardation for light of the color $C_1$. This dictates the value of $\Delta$nd for variable optical retarder 38. That the color $C_1$ of light output state 1 is selected as the one which variable optical retarder 38 provides substantially half-wave retardation is indicated in Column 4, Case 2, of Table II.

Light output state 4 will produce a light output of the color $C_3$ when the term AB'C equals $C_3$ and the term A'BC' equals zero. To obtain light of a pure color $C_3$, the remaining six terms in the transmission equation must equal zero. The term A'B'C' was set to zero in the transmission equation for light output state 1, and the term A'B'C was set to zero in the transmission equation for light output state 2. Since variable optical retarder 38 is commanded to the "OFF" state in light output state 4, it provides substantially half-wave optical retardation of light of the color $C_1$, which was selected with reference to the transmission equation of light output state 2.

The remaining terms of the transmission equation for light output state 4 are $A'BCK_2'K_1$, $AB'C'K_1K_2'$ and $ABC'K_2K_1'$. The previous selections which provide that ABC equal $C_1$ for light output state 1, ABC' equal $C_2$ for light output state 2, and the vertical and horizontal polarization axes for each color selective polarizing filter be complementary necessitate that both of the terms A'BC and AB'C' equal zero in the transmission equation for light output state 4.

The term ABC' provides a light output of the color $C_2$ for light output state 2 in which variable optical retarder 36 is commanded to the "ON" state. Variable optical retarder 36 is commanded to the "OFF" state in light output state 4 and, therefore, is selected to provide substantially half-wave retardation of light of the color $C_2$. This dictates the value of $\Delta$nd for variable optical retarder 36. That the color $C_2$ of light output state 2 is selected as the one which variable optical retarder 36 provides substantially half-wave retardation is indicated in Column 3, Case 2, of Table II.

Table II is a summary of the four cases for which the first preferred embodiment of the switchable color filter will provide light output states in three colors. Column 2 of Table II indicates the light output states selected; and Columns 3 and 4 indicate the colors to which variable optical retarders 36 and 38, respectively, must be tuned to provide substantially half-wave optical retardation. The colors shown in Columns 3 and 4 for Cases 1, 3, and 4 are determined by following a procedure which is analogous to the one described here inabove.

TABLE II

| Case | Light Output States Selected | Light Output State Color Selected for Substantially Half-Wave Retardation By Variable Optical Retarders | |
|---|---|---|---|
| | | 36 | 38 |
| 1 | 1, 2, 3 | 1 | 1 |
| 2 | 1, 2, 4 | 2 | 1 |
| 3 | 1, 3, 4 | 1 | 2 |
| 4 | 2, 3, 4 | 1 | 2 |

Table III sets forth an exemplary selection of colors for each one of the polarization axes of polarizing filters 12, 14, and 16.

TABLE III

| Polarization Axis | Colors Transmitted |
|---|---|
| A (20) | $C_1$, $C_2$, $C_3$ |
| A' (26) | — |
| B (22) | $C_1$, $C_2$ |
| B' (28) | $C_3$ |
| C (24) | $C_1$, $C_3$ |
| C' (30) | $C_2$ |

The colors assigned to the polarization axes satisfy the requirements that ABC equal $C_1$, ABC' equal $C_2$, A'BC equal $C_3$, and each one of the color selective polarizing filters 14 and 16 has complementary axes. Polarizing filter 12 is a neutral polarizing filter and perforce has complementary polarization axes.

If $C_1$ is assigned the color red, $C_2$ the color green, and $C_3$ the color blue, the switchable color filter of the present invention produces in its light output states 1, 2, and 4 light of the colors red, green, and blue, respectively. Variable optical retarder 36 provides substantially half-wave retardation of green light, and variable optical retarder 38 provides substantially half-wave retardation of red light.

It will be understood that colors can be assigned to the polarization axes so that all three polarizing filters will become color selective filters.

Figure 3:
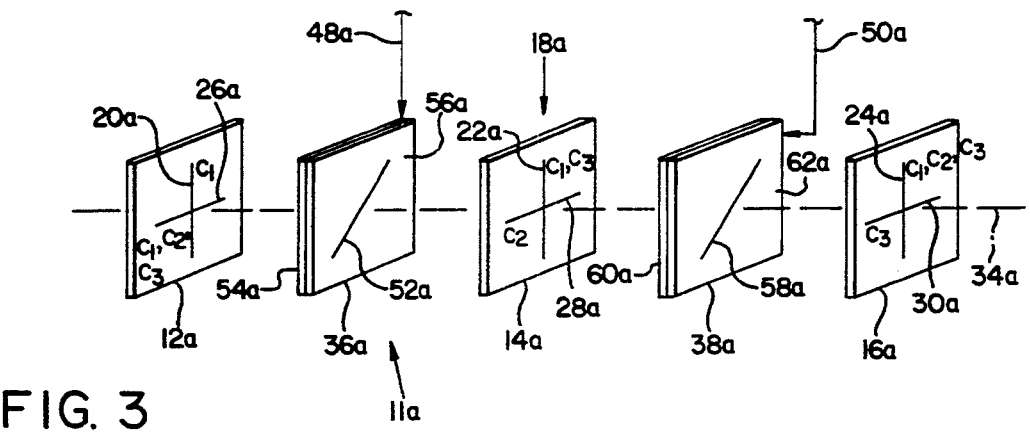
FIG. 3 is a diagram of a second preferred embodiment of the switchable color filter of the present invention in which only the center polarizing filter has complementary polarization axes.

A second preferred embodiment of the switchable color filter of the present invention is shown in FIG. 3. Direct substitution of the second preferred embodiment of the switchable color filter for the first preferred embodiment thereof in the color display system 10 shown in FIG. 1 can be accomplished with appropriate modifications to control circuit 40 to command the variable optical retarders to the switching states which correspond to the desired output of colored light. The second preferred embodiment is characterized in that it provides light output states of the three primary colors with the use of three linear polarizing filters of which only one has complementary polarization states or axes. The optical components corresponding to those of the first preferred embodiment are shown in FIG. 3 with identical reference numerals followed by a lower case "a."

The colors $C_1$, $C_2$, and $C_3$ of light transmitted by the polarization states or axes of polarizing filters 12a, 14a, and 16a are indicated on FIG. 3 and preferably represent the set of the primary colors red, green, and blue.

The three polarizing filters 12a, 14a, and 16a have color selective polarization axes 20a, 22a and 28a, and 30a, respectively. Horizontal polarization axis 26a of polarizing filter 12a and vertical polarization axis 24a of polarizing filter 16a pass light of the three primary colors $C_1$, $C_2$, and $C_3$ or white light. Polarization axes 20a and 26a of polarizing filter 12a pass light of the color $C_1$, and polarization axes 24a and 30a of polarizing filter 16a pass light of the color $C_3$. Neither polarizing filter 12a nor polarizing filter 16a, therefore, has complementary polarization axes.

Vertical polarization axis 22a of polarizing filter 14a passes light of the colors $C_1$ and $C_3$, and horizontal polarization axis 28a of polarizing filter 14a passes light of the color $C_2$. Polarizing filter 14a has complementary polarization axes because neither polarization axis 22a or 28a passes light of a common color.

Variable optical retarder 36a provides substantially half-wave retardation of light of the color $C_2$, and variable optical retarder 38a provides substantially half-wave retardation of light of the color $C_1$.

In light output state 1, variable optical retarders 36a and 38a are commanded by control circuit outputs 48a and 50a, respectively, to the "ON" states and thereby leave unchanged the directions of polarization of light passing therethrough. Light rays incident on vertical polarization axis 20a and horizontal polarization axis 26a of polarizing filter 12a, therefore, become linearly polarized in the vertical and horizontal directions, respectively, and experience no change in polarization direction as they pass through the switchable color filter. Since none of the light rays of the colors $C_1$, $C_2$, and $C_3$ passes through each one of the horizontal polarization axes of polarizing filters 12a, 14a, and 16a, no light exits the switchable color filter through horizontal polarization axis 30a of polarizing filter 16a. Light of only the color $C_1$ is transmitted by each one of the vertical polarization axes of polarizing filters 12a, 14a, and 16a and, therefore, exits the switchable color filter through vertical polarization axis 24a of polarizing filter 16a.

In light output state 2, variable optical retarder 36a is commanded by control circuit output 48a to the "ON" state, and variable optical retarder 38a is commanded by control circuit output 50a to the "OFF" state. Since variable optical retarder 36a is in the "ON" state, the polarization directions of light rays passing therethrough remain unchanged. Thus, light of the color $C_1$ passes through vertical polarization axis 22a, and light of the color $C_2$ passes through horizontal polarization axis 28a of polarizing filter 14a. Since variable optical retarder 38a is in the "OFF" state and is tuned to provide substantially half-wave retardation of light of the color $C_1$, the direction of polarization of light rays of the color $C_1$ is rotated 90° and the light rays are completely absorbed by horizontal polarization axis 30a of polarizing filter 16a.

Since variable optical retarder 38a in the "OFF" state does not provide substantially half-wave retardation of light of colors other than $C_1$, the direction of polarization of light rays of the color $C_2$ which pass through variable optical retarder 38a is rotated at an angle other than 90°. Light rays of the color $C_2$, therefore, are separated into components which lie along the vertical and horizontal polarization axes of polarizing filter 16a. Light rays of the color $C_2$ include major components of light projected onto and transmitted through vertical polarization axis 24a and minor components of light projected onto and absorbed by horizontal polarization axis 30a. Light of the color $C_2$ exits the switchable color filter in light output state 2.

In light output state 4, variable optical retarder 36a is commanded by control circuit output 48a to the "OFF" state which provides substantially half-wave retardation of light of the color $C_2$, and variable optical retarder 38a is commanded by control circuit output 50a to the "OFF" state which provides substantially half-wave optical retardation of light of the color $C_1$. Light of the color $C_1$ passes through vertical polarization axis 20a; and light of the colors $C_1$, $C_2$, and $C_3$ pass through horizontal polarization axis 26a of polarizing filter 12a.

Since variable optical retarder 36a is in the "OFF" state and is tuned to provide substantially half-wave retardation of light of the color $C_2$, the direction of polarization of light rays of the color $C_2$ is rotated 90° and the light rays are completely absorbed by vertical polarization axis 22a of polarizing filter 14a. Light rays of the colors $C_1$ and $C_3$ are separated into components which include major components of light projected onto and passing through vertical polarization axis 22a and minor components of light projected onto and absorbed by horizontal polarization axis 28a. Light rays of the color $C_1$ are separated into components which include major components of light projected onto and absorbed by horizontal polarization axis 28a of polarizing filter 14a and minor components of light projected onto and transmitted through vertical polarization axis 22a of polarizing filter 14a. Thus, light of the color $C_1$ which is projected onto and passes through vertical polarization axis 22a is comprised of components of light passing through vertical polarization axis 20a and horizontal polarization axis 26a of polarizing filter 12a.

Light rays of the colors $C_1$ and $C_3$ pass through variable optical retarder 38a which is tuned to provide substantially half-wave retardation of light of the color $C_1$. The polarization direction of light rays of the color $C_1$ is rotated 90° and the light rays are completely absorbed by horizontal polarization axis 30a of polarizing filter 16a. Light rays of the color $C_3$ are separated into components which include major components of light projected onto and passing through horizontal polarization axis 30a and minor components of light projected onto and passing through vertical polarization axis 24a of polarizing filter 16a. Light of the color $C_3$, therefore, exits both polarization axes of polarizing filter 16a in light output state 4.

The three light output states which provide light of pure colors are summarized in Table IV.

TABLE IV

| Light Output State | Switching State of Variable Optical Retarder 36a | Switching State of Variable Optical Retarder 38a | Color of Light Output |
|---|---|---|---|
| 1 | ON | ON | $C_1$ |
| 2 | ON | OFF | $C_2$ |
| 3 | OFF | ON | Unused |
| 4 | OFF | OFF | $C_3$ |

Figure 4:
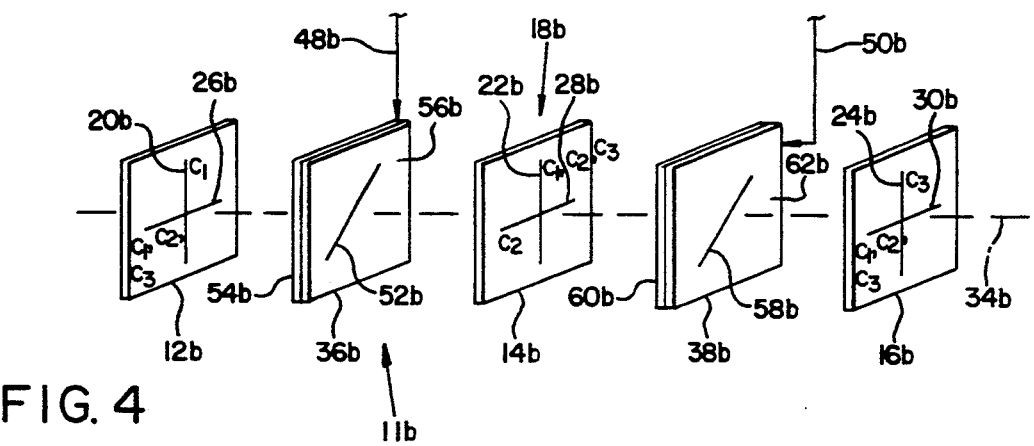
FIG. 4 is a diagram of the third preferred embodiment of the switchable color filter of the present invention in which none of the polarizing filters has complementary polarization axes and each polarizing filter has a polarization axis which transmits white light.

A third preferred embodiment of the switchable color filter of the present invention is shown in FIG. 4. Direct substitution of the third preferred embodiment of the switchable color filter for the first preferred embodiment thereof in the color display system 10 shown in FIG. 1 can be accomplished with appropriate modifications to control circuit 40 to command the variable optical retarders to the switching states which correspond to the desired output of colored light. The third preferred embodiment is characterized in that it provides light output states of the three primary colors and white light with the use of three linear polarizing filters of which none has complementary polarization states or axes and each one has a polarization axis that passes white light. The optical components corresponding to those of the first preferred embodiment are shown in FIG. 4 with identical reference numerals followed by a lower case "b."

The colors $C_1$, $C_2$, and $C_3$ of light transmitted by the polarization states or axes of polarizing filters 12$b$, 14$b$, and 16$b$ are indicated on FIG. 4 and preferably represent the set of the primary colors red, green, and blue.

The three polarizing filters 12$b$, 14$b$, and 16$b$ have polarization axes 20$b$, 28$b$, and 24$b$, respectively, which are color selective and polarization axes 26, 22$b$, and 30$b$, respectively, which pass light of the primary colors $C_1$, $C_2$, and $C_3$ or white light. Vertical polarization axis 20$b$ of polarizing filter 12$b$ passes light of the color $C_1$; horizontal polarization axis 28$b$ of polarizing filter 14$b$ passes light of the color $C_2$; and vertical polarization axis 24$b$ of polarizing filter 16$b$ passes light of the color $C_3$. None of the polarizing filters has complementary polarization axes. Variable optical retarders 36$b$ and 38$b$ provide substantially half-wave retardation of light of the color $C_2$.

In light output state 1, variable optical retarders 36$b$ and 38$b$ are commanded by control circuit outputs 48$b$ and 50$b$, respectively, to the "ON" states and thereby leave unchanged the directions of polarization of light passing therethrough. Light rays incident on vertical polarization axis 20$b$ and horizontal polarization axis 26$b$ of polarizing filter 12$b$, therefore, become linearly polarized in the vertical and horizontal directions, respectively, and experience no change in polarization direction as they pass through the switchable color filter. Since none of the light rays of the colors $C_1$, $C_2$, and $C_3$ passes through each one of the vertical polarization axes of polarizing filters 12$b$, 14$b$, and 16$b$, no light exits the switchable color filter through vertical polarization axis 24$b$ of polarizing filter 16$b$. Light of only the color $C_2$ is transmitted by each one of the horizontal polarization axes of polarizing filters 12$b$, 14$b$, and 16$b$ and, therefore, exits the switchable color filter through horizontal polarization axis 30$b$ of polarizing filter 16$b$.

In light output state 2, variable optical retarder 36$b$ is commanded by control circuit output 48$b$ to the "ON" state, and variable optical retarder 38$b$ is commanded by control circuit output 50$b$ to the "OFF" state. Since variable optical retarder 36$b$ is in the "ON" state, the polarization directions of light rays passing therethrough remain unchanged. Thus, light of the color $C_1$ passes through vertical polarization axis 22$b$, and light of the color $C_2$ passes through horizontal polarization axis 28$b$ of polarizing filter 14$b$. Since variable optical retarder 38$b$ is in the "OFF" state and is tuned to provide substantially half-wave retardation of light of the color $C_2$, the direction of polarization of light rays of the color $C_2$ is rotated 90° and the light rays are completely absorbed by vertical polarization axis 24$b$ of polarizing filter 16$b$.

Since variable optical retarder 38$b$ in the "OFF" state does not provide substantially half-wave retardation of light of colors other than $C_2$, the direction of polarization of light rays of the color $C_1$ which pass through variable optical retarder 38$b$ is rotated at an angle other than 90°. Light rays of the color $C_1$, therefore, are separated into components which lie along the vertical and horizontal polarization axes of polarizing filter 16$b$. Light rays of the color $C_1$ include major components of light projected onto and transmitted through horizontal polarization axis 30$b$ and minor components of light projected onto and absorbed by vertical polarization axis 24$b$. Light of the color $C_1$ exits the switchable color filter in light output state 2.

In light output state 3, variable optical retarder 36$b$ is commanded by control circuit output 48D to the "OFF" state, and variable optical retarder 38$b$ is commanded by control circuit output 50$b$ to the "ON" state. Light of the color $C_1$ passes through vertical polarization axis 20$b$, and light of the colors $C_1$, $C_2$, and $C_3$ pass through horizontal polarization axis 26$b$ of polarizing filter 12$b$.

Since variable optical retarder 38$b$ is in the "OFF" state and is tuned to provide substantially half-wave retardation of light of the color $C_2$, the direction of polarization of light rays of the color $C_2$ is rotated 90° and the light rays are transmitted through only vertical polarization axis 22$b$ of polarizing filter 14$b$. Light rays of the color $C_1$ are separated into components which include major components of light projected onto and absorbed by horizontal polarization axis 28$b$ and minor components of light projected onto and transmitted through vertical polarization axis 22$b$ of polarizing filter 14$b$. Similarly, light rays of the colors $C_1$ and $C_3$ include major components of light projected onto and transmitted through vertical polarization axis 22$b$ and minor components of light projected onto and absorbed by horizontal polarization axis 28$b$ of polarizing filter 14$b$. The effect of variable optical retarder 36$b$ which is in the "OFF" state and is tuned to provide substantially half-wave retardation of light of the color $C_2$ is to pass light of the colors $C_1$, $C_2$, $C_3$ through vertical polarization axis 22$b$ and no light through horizontal polarization axis 28$b$ of polarizing filter 14$b$.

Since variable optical retarder 36$b$ is in the "ON" state, the polarization directions of light rays passing therethrough remain unchanged. Thus, light of only the color $C_3$ passes through vertical polarization axis 24$b$ of polarizing filter 16$b$. Light of the color $C_3$ exits the switchable color filter in light output state 3.

In light output state 4, variable optical retarders 36$b$ and 38$b$ are commanded by control circuit outputs 48$b$ and 50$b$, respectively, to the "OFF" states which provide substantially half-wave retardation of light of the color $C_2$. As is the case for light output state 3 in which variable optical retarder 36$b$ is in the "OFF" state, light rays of the colors $C_1$, $C_2$, and $C_3$ pass through vertical polarization axis 22$b$ and no light passes through horizontal polarization axis 28$b$ of polarizing filter 14$b$.

Since variable optical retarder 38$b$ is in the "OFF" state and is tuned to provide substantially half-wave retardation of light of the color $C_2$, the direction of polarization of light rays of the color $C_2$ is rotated 90° and the light rays are transmitted through horizontal polarization axis 30$b$ of polarizing filter 16$b$. Light rays of the colors $C_1$ and $C_3$ are separated into components which include major components of light projected onto and passing through horizontal polarization axis 30$b$ and minor components of light projected onto vertical polarization axis 24$b$ of polarizing filter 16$b$. The minor components of light of the color $C_3$ are transmitted through and the minor components of light of the color $C_1$ are absorbed by vertical polarization axis 24$b$ of polarizing filter 16$b$. Light of the colors $C_1$, $C_2$, and $C_3$, i.e., white light, exits the switchable color filter in light output state 4.

It will be understood that there exists a slight color imbalance due to the separation into and selective absorption of the light rays of the colors $C_1$, $C_2$, and $C_3$ which form the white light. Compensation for the color imbalance can be effected by changing the concentration of the pleochroic dyes during fabrication of the polarizing filters.

The four light output states which provide light of three pure colors and white light are summarized in Table V.

TABLE V

| Light Output State | Switching State of Variable Optical Retarder 36b | Switching State of Variable Optical Retarder 38b | Color of Light Output |
|---|---|---|---|
| 1 | ON | ON | $C_2$ |
| 2 | ON | OFF | $C_1$ |
| 3 | OFF | ON | $C_3$ |
| 4 | OFF | OFF | $C_1$, $C_2$, $C_3$ |

Figure 5:
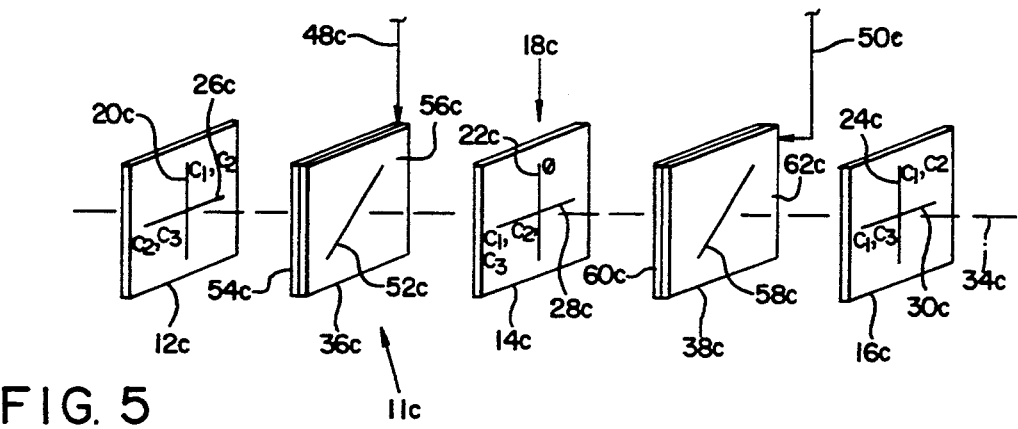
FIG. 5 is a diagram of the fourth preferred embodiment of the switchable color filter of the present invention in which each one of the three polarizing filters has at least one polarization axis which transmits light of at least two colors.

A fourth preferred embodiment of the switchable color filter of the present invention is shown in FIG. 5. Direct substitution of the fourth preferred embodiment of the switchable color filter for the first preferred embodiment thereof in the color display system 10 shown in FIG. 1 can be accomplished with appropriate modifications to control circuit 40 to command the variable optical retarders to the switching states which correspond to the desired output of colored light. The fourth preferred embodiment is characterized in that it provides light output states of the three primary colors and a color which is a combination of two of the primary colors. This is accomplished with the use of three linear polarizing filters of which each one has at least one polarization state or axis that transmits light of at least two colors. The optical components corresponding to those of the first preferred embodiment are shown in FIG. 5 with identical reference numerals followed by a lower case "c."

The colors $C_1$, $C_2$, and $C_3$ of light transmitted by the polarization states or axes of polarizing filters 12c, 14c, and 16c are indicated on FIG. 5 and preferably represent the set of the primary colors red, green, and blue.

Each one of the three polarizing filters 12c, 14c, and 16c has at least one color selective polarization axis. Vertical polarization axis 20c of polarizing filter 12c passes light of the colors $C_1$ and $C_2$, and horizontal polarization axis 26c of polarizing filter 12c passes light of the colors $C_2$ and $C_3$. Vertical polarization axis 22c of polarizing filter 14c absorbs light of all colors, and horizontal polarization axis 28c of polarizing filter 14c passes light of the three primary colors $C_1$, $C_2$, and $C_3$ or white light. Vertical polarization axis 24c of polarizing filter 16c passes light of the colors $C_1$ and $C_2$, and horizontal polarization axis 30c of polarizing filter 16c passes light of the colors $C_1$ and $C_3$. Only polarizing filter 14c has complementary polarization axes. Variable optical retarders 36c and 38c provide substantially half-wave retardation of light of the color $C_3$.

In light output state 1, variable optical retarders 36c and 38c are commanded by control circuit outputs 48c and 50c, respectively, to the "ON" states and thereby leave unchanged the directions of polarization of light passing therethrough. Light rays incident on vertical polarization axis 20c and horizontal polarization axis 26c of polarizing filter 12c, therefore, become linearly polarized in the vertical and horizontal directions, respectively, and experience no change in polarization direction as they pass through the switchable color filter. Since no light rays pass through vertical polarization axis 22c of polarizing filter 14c, no light exits the switchable color filter through vertical polarization axis 24c of polarizing filter 16c. Light of only the color $C_3$ is transmitted by each one of the horizontal polarization axes of polarizing filters 12c, 14c, and 16c and, therefore, exits the switchable color filter through horizontal polarization axis 30c of polarizing filter 16c.

In light output state 2, variable optical retarder 36c is commanded by control circuit output 48c to the "ON" state, and variable optical retarder 38c is commanded by control circuit output 50c to the "OFF" state. Since variable optical retarder 36c is in the "ON38 state, the polarization directions of light rays passing therethrough remain unchanged. Thus, no light passes through vertical polarization axis 22c, and light rays of the colors $C_2$ and $C_3$ pass through horizontal polarization axis 28c of polarizing filter 14c. Since variable optical retarder 38c is in the "OFF" state and is tuned to provide substantially half-wave retardation of light of the color $C_3$, the direction of polarization of light rays of the color $C_3$ is rotated 90° and the light rays are completely absorbed by vertical polarization axis 24c of polarizing filter 16c.

Since variable optical retarder 38c in the "OFF" state does not provide substantially half-wave retardation of light of colors other than $C_3$, the direction of polarization of light rays of the color $C_2$ which pass through variable optical retarder 38c is rotated at an angle other than 90°. Light rays of the color $C_2$, therefore, are separated into components which lie along the vertical and horizontal polarization axes of polarizing filter 16c. Light rays of the color $C_2$ include major components of light projected onto and transmitted through vertical polarization axis 24c and minor components of light projected onto and absorbed by horizontal polarization axis 30c. Light of the color $C_2$ exits the switchable color filter in light output state 2.

In light output state 3, variable optical retarder 36c is commanded by control circuit output 48c to the "OFF" state, and variable optical retarder 38c is commanded by control circuit output 50c to the "ON" state. Light rays of the colors $C_1$ and $C_2$ pass through vertical polarization axis 20c, and light rays of the colors $C_2$ and $C_3$ pass through horizontal polarization axis 26c of polarizing filter 12c.

Since variable optical retarder 38c is in the "OFF" state and is tuned to provide substantially half-wave retardation of light of the color $C_3$, the direction of polarization of light rays of the color $C_3$ is rotated 90° and the light rays are absorbed by vertical polarization axis 22c of polarizing filter 14c. Since light rays of the color $C_2$ are transmitted through both polarization axes of polarizing filter 12c, major and minor components of light rays of the color $C_2$ are projected onto and absorbed by vertical polarization axis 22c and transmitted through horizontal polarization axis 28c of polarizing filter 14c. Light rays of the color $C_1$ include major components of light projected onto and transmitted through horizontal polarization axis 28c and minor components of light projected onto and absorbed by vertical polarization axis 22c of polarizing filter 14c. The effect of variable optical retarder 36c which is in the "OFF" state and is tuned to provide substantially half-wave retardation of light of the color $C_3$ is to pass no light through vertical polarization axis 22c and light rays of the colors $C_1$ and $C_2$ through horizontal polarization axis 28c of polarizing filter 14c.

Since variable optical retarder 36c is in the "ON" state, the polarization directions of light rays passing therethrough remain unchanged. Thus, light of only the color $C_1$ passes through horizontal polarization axis 30c of polarizing filter 16c. Light of the color $C_1$ exits the switchable color filter in light output state 3.

In light output state 4, variable optical retarders 36c and 38c are commanded by control circuit outputs 48c and 50c, respectively, to the "OFF" states which provide substantially half-wave retardation of light of the color $C_3$. As in the case for light output state 3 in which variable optical retarder 36c is in the "OFF" state, no light passes through vertical polarization axis 22c and light rays of the colors $C_1$ and $C_2$ pass through horizontal polarization axis 28 of polarizing filter 14c.

Since variable optical retarder 38c is in the "OFF" state and is tuned to provide substantially half-wave retardation of light of the color $C_3$, light rays of the colors $C_1$ and $C_2$ are separated into components which include major components of light projected onto and passing through vertical polarization axis 24c and minor components of light projected onto horizontal polarization axis 30c of polarizing filter 16c. The minor components of light of the color $C_1$ are transmitted through and the minor components of light of the color $C_2$ are absorbed by horizontal polarization axis 30c of polarizing filter 16c. Light rays of the colors $C_1$ and $C_2$ exit the switchable color filter in light output state 4.

The four light output states which provide light of three pure colors and light which is a combination of two colors are summarized in Table VI.

TABLE VI

| Light Output State | Switching State of Variable Optical Retarder 36c | Switching State of Variable Optical Retarder 38c | Color of Light Output |
|---|---|---|---|
| 1 | ON | ON | $C_3$ |
| 2 | ON | OFF | $C_2$ |
| 3 | OFF | ON | $C_1$ |
| 4 | OFF | OFF | $C_1 + C_2$ |

If $C_1$ is assigned the color red, $C_2$ the color green, and $C_3$ the color blue, the switchable color filter of the present invention produces in its light output states 1, 2, 3, and 4 light of the colors blue, green, red, and yellow, respectively. Variable optical retarders 36c and 38c provide substantially half-wave retardation of blue light.

For the second, third, and fourth preferred embodiments of the switchable color filter, the colors of light transmitted through the polarization axes of the polarizing filters and subjected to substantially half-wave retardation by the variable optical retarders have been determined empirically. It is believed, however, that light output transmission functions for the second, third, and fourth preferred embodiments can be derived to facilitate the determination of the colors of light which can be transmitted through the polarizing filters and subjected to substantially half-wave retardation by the variable optical retarders to provide the desired light output states.

It will be understood that although the four preferred embodiments of the switchable color filter described herein incorporate light polarizing systems having polarizing filters characterized in that each one passes light of the three primary colors, polarizing filters which pass light of other colors and colors which are different from the ones passed by the other polarizing filters in a light polarizing system may be utilized to produce light output states of three pure colors. The variable optical retarders can be tuned to provide substantially half-wave retardation of light of colors which are different from the primary colors.

Liquid Crystal Variable Optical Retarder

The preferred embodiments of the present invention incorporate a pair of liquid crystal cells operating as zero to substantially half-wave optical retarders. Each such liquid crystal cell controls the retardation of light passing therethrough in response to the intensity of an electric field produced by an excitation voltage applied to the cell electrode structures.

With reference to FIG. 6, a liquid crystal cell 100 includes a pair of generally parallel, spaced-apart electrode structures 102 and 104 with nematic liquid crystal material 106 included therebetween. Electrode structure 102 comprises glass dielectric substrate 108 which has on its inner surface a layer 110 of electrically conducting, but optically transparent, material such as indium tin oxide. Director alignment film layer 112 is applied to conductive layer 110 and forms a boundary between electrode structure 102 and liquid crystal material 106. The surface of film 112 which contacts the liquid crystal material is conditioned in accordance with one of two preferred methods to promote a preferred orientation of the directors of the liquid crystal material in contact therewith. The materials constituting and the corresponding methods of conditioning the director alignment film 112 are described in detail hereinbelow. Electrode structure 104 is of a construction similar to that of electrode structure 102, and the components corresponding to those of electrode structure 102 are shown with identical reference numerals followed by primes.

The short length edges of electrode structures 102 and 104 are offset relative to each other to provide access to conductive layers 110 and 110' for connecting at terminals 113 the conductors of a selected output of control circuit 40. Spacers 114 may be comprised of any suitable material such as glass fiber to preserve the general parallel relation between electrode structures 102 and 104.

With reference to FIGS. 7A-7D, the nematic director alignment configuration of layers 112 and 112' in liquid crystal cell 100 is described in Column 7, lines 48-55, of U.S. Pat. No. 4,333,708 of Boyd, et al. It will be understood, however, that the liquid crystal cell described in the Boyd, et al. patent differs from that of the present invention in that the former includes an alternating-tilt geometry type configuration of which the director alignment of cell 100 comprises only a portion. The cell of the Boyd, et al. patent is constructed to promote disclination movement within the cell in an attempt to provide a bistable switching device.

The film layer 112 of electrode structure 102 is conditioned so that the electrode structure surface contacting directors 116 are aligned parallel to each other at a tilt bias angle $+\Theta$, which is measured in the counterclockwise sense with reference to the surface of film layer 112. The film layer 112' of electrode structure 104 is conditioned so that the electrode structure surface contacting directors 118 are aligned parallel to each other at a tilt bias angle $-\Theta$ which is measured in the clockwise sense with reference to the surface of film layer 112'. Thus, liquid crystal cell 100 is fabricated so that the surface contacting directors 116 and 118 of the opposed surfaces of director alignment layers 112 and 112' of electrode structures 102 and 104, respectively, are tilt-biased in opposite directions.

A first preferred method of effecting the desired alignment of the surface contacting directors entails the use of polyimide as the material which comprises the alignment film layers 112 and 112' on electrode structures 102 and 104, respectively. Each alignment film layer is rubbed to produce a tilt bias angle $|\Theta|$, with 2° to 5° being the preferred range. A second preferred method of effecting the desired alignment of the surface contacting directors entails the use of silicon monoxide as the material which comprises the alignment film layers 112 and 112' of electrode structures 102 and 104, respectively. The silicon monoxide layer is evaporated and vapor deposited preferably at a 5° angle measured from the electrode structure surface in an amount sufficient to produce a tilt bias angle $|\Theta|$ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 7A depicts the orientation of surface noncontacting directors 120 when an AC signal $V_1$ of approximately 2 kHz and 20 Vrms is applied to conductive layers 110 and 110' of electrode structures 102 and 104, respectively. The signal $V_1$ on conductive layer 110' constitutes a first switching state produced at the selected output of control circuit 40 and produces an alternating electric field, E, between electrode structures 102 and 104 within the liquid crystal cell 100 to force the cell into its "ON" state. A substantial number of the surface noncontacting directors 120 of a liquid crystal material 106 which has a positive anisotropy value align essentially end-to-end along direction 121 of the electric field flux lines within the cell, which direction is normal to the conditioned surfaces of the electrode structures. Thus, when cell 100 is excited into its "ON" state, the surface noncontacting directors 120 are aligned perpendicularly to the surfaces of the cell. It should be noted that the surface contacting directors 116 and 118 substantially maintain their tilt bias angles $|\Theta|$ in the two topological states of the cell, the first of which states is shown in FIGS. 7A to 7C and the second of which states is shown in FIG. 7D.

FIG. 7B depicts the orientation of surface noncontacting directors 120 after the signal $V_1$ is removed so that the alignment of surface noncontacting directors is influenced not by an electric field produced between electrode structures 102 and 104 within the cell, but by the intermolecular elastic forces which cause relaxation of the surface noncontacting directors from the end-to-end alignment of the "ON" state. The removal of signal $V_1$ constitutes a second switching state produced at the selected output of control circuit 40. The director orientation shown in FIG. 7B corresponds to that of the "OFF" state of the cell.

Switching cell 100 to the "OFF" state can also be accomplished by applying to the cell an AC signal $V_2$ produced at the selected output of control circuit 40 having a voltage level which is less than that of signal $V_1$ and generally about 0.1 V. The frequency of signal $V_2$ is generally the same as that of signal $V_1$.

During the transition from the "ON" state to the "OFF" state of the liquid crystal cell, the surface noncontacting directors recede from the end-to-end alignment normal to the electrode structure surfaces and attempt to assume a generally parallel relation with the adjacent directors. Thus, surface noncontacting directors 120a and 120b rotate in a clockwise sense as shown by direction arrows 122a in order to achieve a near-parallel relation as respects directors 116 and 120a, respectively; and surface noncontacting directors 120c and 120d rotate in a counterclockwise sense as shown by direction arrows 122b to achieve a near-parallel relation as respects directors 118 and 120c, respectively. Thus, when cell 100 relaxes to its "OFF" state, each one of a substantial number of the surface noncontacting directors is aligned so that it projects a director component onto the surfaces of the cell. The surface noncontacting directors, however, lie approximately in a plane which is perpendicular to the surfaces of the cell.

It should be noted that the surface geometry of cell 100 differs from that of a conventional liquid crystal variable retardation cell such as the one described in the publication "Transient Behavior of Twisted Nematic Liquid-Crystal Layer in an Electric Field," *Journal De Physique*, Vol 36, pp. C1-261–C1-263 by C. F. Van Doorn in which the tilt bias angles are of the same rotational sense as measured from the inner surfaces of the electrode structure. The surface contacting director configuration of cell 100 induces rapid surface noncontacting director relaxation without any optical bounce from the "ON" state to the "OFF" state. It is presently believed that the rapid, optical bounce-free director relaxation is caused by the flow of liquid crystal material in the same direction 124 along both conditioned surfaces of the cell. Such unidirectional flow does not occur in the conventional cell described in the publication by Van Doorn which cell experiences liquid crystal material flow in opposite directions along the conditioned surfaces. The beneficial effect of the unidirectional material flow in cell 100 is that no "reverse" torque is applied to the centrally located surface noncontacting directors 120e by such flow in the relaxing cell. The result is that bounce-free, rapid electro-optical switching is achieved.

FIG. 7C depicts the orientation of the directors after a time $T_1$ during which liquid crystal cell 100 is allowed to relax further beyond the "OFF" state shown in FIG. 7B. This will occur generally if an electric field is not reintroduced within the cell after approximately 50 milliseconds has elapsed from the time the electric field had been removed. The director configuration of the cell shown in FIG. 7C is characterized in that the surface noncontacting directors 120 relinquish their planar configuration and assume what is referred to as a $\pi$ radian twist or helical configuration. With further relaxation, the cell in the $\pi$ radian twist configuration will experience disclination movement and degenerate over a time period $T_2$ of approximately several minutes to the splayed configuration depicted in FIG. 7D. It should be noted that the periodic application of an AC signal $V_3$ of approximately 1.0 V to the cell will prevent further relaxation of the surface noncontacting directors to the $\pi$ radian twist state.

The method of operating the liquid crystal cell 100 as a zero to substantially half-wave optical retarder is directed to the disclination-free surface noncontacting director relaxation from the electric field aligned or "ON" state depicted by FIG. 7A to the planar configuration or "OFF" state depicted by FIG. 7B.

In the present invention, liquid crystal cell 100 is operated as a zero to substantially half-wave optical retarder whose optic axis corresponds to the alignment direction of the nonsurface contacting directors 120.

Linearly polarized light which propagates in direction 126 normal to the surfaces of electrode structures 102 and 104 is coincident with the direction of surface noncontacting directors 120 when the liquid crystal cell is in the "ON" state. Directors 120 are oriented in such "ON" state so that there is a negligible projection of the optic axis on the electrode structure surfaces of the cell. Under these conditions, liquid crystal cell 100 produces substantially reduced optical retardation for incident light propagating in the direction 126.

Linearly polarized light which propagates in direction 126 normal to the surfaces of electrode structures 102 and 104 is noncoincident with the alignment direction of surface noncontacting directors when the liquid crystal cell is in the "OFF" state. Directors 120 are oriented in such "OFF" state so that each one of a substantial number of them projects a component on the electrode structure surfaces of the cell. Under these conditions, liquid crystal cell 100 has an effective birefringence for generally normally incident light. The orientation of surface noncontacting directors 120 provides substantially half-wave optical retardation for light of the wavelength which satisfies the mathematical expression:

$$\frac{\Delta nd}{\lambda} = \frac{1}{2}$$

where d represents the thickness 128 and $\Delta n$ represents the effective birefringence of the cell.

With reference to FIG. 8, the optical transmission response of a liquid crystal cell which is disposed between a pair of neutral polarizing filters having their transmission axes in parallel alignment is shown to provide approximately a 1.0 millisecond transition time between the "ON" and the "OFF" states of the cell. This response time was accomplished with a cell fabricated with E-44 type liquid crystal material manufactured by BDH Chemicals Ltd. of Poole, England, of 3 micron thickness and driven by a +20 Vrms 2 kHz pulse. This relatively fast optical response is attributed to the elimination of optical bounce that has been accomplished by virtue of the promotion of unidirectional flow of liquid crystal material within the cell during surface noncontacting director realignment which occurs between the transition from the "ON" state to the "OFF" state.

It will be obvious to those having skill in the art that many changes may be made in the above-described details of the preferred embodiments of the present invention. The scope of the present invention, therefore, should be determined only by the following claims.

We claim:

1. A switchable color filter which receives light from a light source, comprising:

three polarizing means in optical communication with the light source, at least two of the three polarizing means including color selective polarizing filters;

a pair of liquid crystal variable optical retarding means positioned so that each one of the pair of liquid crystal variable optical retarding means is disposed between a different pair of the three polarizing means, each one of the variable optical retarding means including liquid crystal material which has directors and is contained between a pair of generally parallel electrode structures, each electrode structure including a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to that of the tilt bias angles of the directors in contact with the other conditioned surface; and control means in communication with the pair of liquid crystal variable optical retarding means to selectively pass a light output of one of at least three colors.

2. The switchable color filter of claim 1 in which at least one of the color selective polarizing filters has first and second substantially orthogonally related polarization states which are characterized in that neither polarization state passes light of a color which is passed by the other polarization state.

3. The switchable color filter of claim 2 in which one of the polarizing means comprises a neutral polarizing filter.

4. The switchable color filter of claim 1 in which two of the color selective polarizing filters have first and second substantially orthogonally related polarization states which pass light of a predetermined set of colors, the first polarization states of the color selective polarizing filters passing light of first subsets of the set of colors and the second polarization states of the color selective polarizing filters passing light of second subsets of the set of colors, each one of the two color selective polarizing filters being characterized in that its first subset includes at least one color which is included in its second subset.

5. The switchable color filter of claim 4 in which three colors of the selectable light outputs are included in the set of colors.

6. The switchable color filter of claim 1 in which each one of the three polarizing means comprises a color selective polarizing filter having a pair of orthogonally related polarization states of which one polarization state passes white light, and the control means further comprises means to selectively provide a light output state of white light.

7. The switchable color filter of claim 6 in which each one of the pair of variable optical retarding means comprises a zero to substantially half-wave optical retarder which is tuned to provide substantially half-wave retardation of light of a predetermined color that is the same for both variable optical retarding means of the pair.

8. The switchable color filter of claim 6 in which the other one of the pair of polarization states of each one of the three color selective polarizing filters passes light of only one color.

9. The switchable color filter of claim 1 in which the three polarizing means have first and second substantially orthogonally related polarization states of which at least one polarization state of each one of the three polarizing means passes light of at least two colors.

10. The switchable color filter of claim 1 in which two of the color selective polarizing filters have first and second substantially orthogonally related polarization states of which each polarization state passes light of two colors.

11. The switchable color filter of claim 10 in which, for each one of the two color selective polarizing filters, one of the two colors of light passed by the first and second polarization states is the same.

12. The switchable color filter of claim 1 in which one of the three polarizing means is disposed between the pair of variable optical retarding means and comprises a neutral polarizing filter.

13. The switchable color filter of claim 1 in which each one of the three polarizing means comprises a linear polarizing filter.

14. The switchable color filter of claim 1 in which one of the polarizing means comprises a neutral polarizing filter.

15. The switchable color filter of claim 1 in which the light source is a cathode ray tube emitting a black and white image which includes wavelengths of light of the colors transmitted by the color selective polarizing filters.

16. The switchable color filter of claim 1 in which one of the variable optical retarding means is a zero to substantially half-wave optical retarder.

17. A field sequential color display system, comprising:
a light source;
image information generating means in communication with the light source to produce light image information;
three polarizing means in optical communication with the light source, at least two of the three polarizing means including color selective polarizing filters;
a pair of liquid crystal variable optical retarding means positioned so that each one of the pair of liquid crystal variable optical retarding means is disposed between a different pair of the three polarizing means, each one of the variable optical retarding means including liquid crystal material which has directors and is contained between a pair of generally parallel electrode structures, each electrode structure including a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to that of the tilt bias angles of the directors in contact with the other conditioned surface;
control means in communication with the pair of liquid crystal variable optical retarding means to selectively pass a light output of one of at least three colors; and
synchronizing means to synchronize a light output of one of the three colors to a predetermined one of the light image information to provide a light image in a desired color.

18. The color display system of claim 17 in which at least one of color selective polarizing filters has first and second substantially orthogonally related polarization states which are characterized in that neither polarization state passes light of a color which is passed by the other polarization state.

19. The color display system of claim 18 in which one of the polarizing means comprises a neutral polarizing filter.

20. The color display system of claim 17 in which two of the color selective polarizing filters have first and second substantially orthogonally related polarization states which pass light of a predetermined set of colors, the first polarization states of the color selective polarizing filters passing light of first subsets of the set of colors and the second polarization states of the color selective polarizing filters passing light of second subsets of the set of colors, each one of the two color selective polarizing filters being characterized in that its first subset includes at least one color which is included in its second subset.

21. The color display system of claim 20 in which three colors of the selectable light outputs are included in the set of colors.

22. The color display system of claim 17 in which each one of the three polarizing means comprises a color selective polarizing filter having a pair of orthogonally related polarization states of which one polarization state passes white light, and the control means further comprises means to selectively provide a light output state of white light.

23. The color display system of claim 22 in which each one of the pair of variable optical retarding means comprises a zero to substantially half-wave optical retarder which is tuned to provide substantially half-wave retardation of light of a predetermined color that is the same for both of them.

24. The color display system of claim 22 in which the other one of the pair of polarization states of each one of the three color selective polarizing filters passes light of only one color.

25. The color display system of claim 17 in which the three polarizing means have first and second substantially orthogonally related polarization states of which at least one polarization state of each one of the three polarizing means passes light of at least two colors.

26. The color display system of claim 17 in which two of the color selective polarizing filters have first and second substantially orthogonally related polarization states of which each polarization state passes light of two colors.

27. The color display system of claim 26 in which, for each one of the two color selective polarizing filters, one of the two colors of light passed by the first and second polarization states is the same.

28. The color display system of claim 17 in which one of the three polarizing means is disposed between the pair of variable optical retarding means and comprises a neutral polarizing filter.

* * * * *